(12) United States Patent
Lynch (10) Patent No.: US 7,037,056 B2
(45) Date of Patent: May 2, 2006

(54) SHEET MEMBER DISPENSING APPARATUS FOR USE WITH ARTICLES STACKED ON A BED OF A TRAILER

(76) Inventor: Gregory Lynch, 2350 Waterford Grace, New Braunfels, TX (US) 78130

(*) Notice: Subject to any disclaimer, the term of this patent is extended or adjusted under 35 U.S.C. 154(b) by 0 days.

(21) Appl. No.: 10/759,647

(22) Filed: Jan. 16, 2004

(65) Prior Publication Data
US 2005/0158137 A1  Jul. 21, 2005

(51) Int. Cl.
*B65D 63/00* (2006.01)
(52) U.S. Cl. .................................... 410/97
(58) Field of Classification Search ........... 410/97, 410/117, 118; 296/24.3; 224/42.33, 42.34
See application file for complete search history.

(56) References Cited

U.S. PATENT DOCUMENTS

| | | | |
|---|---|---|---|
| 1,770,503 A | 7/1930 | Williams | |
| 4,342,480 A | 8/1982 | Ross, Jr. | |
| 4,700,985 A | 10/1987 | Whitehead | |
| 4,964,771 A * | 10/1990 | Callihan | 410/118 |
| 5,007,672 A | 4/1991 | Koch | |
| 5,152,575 A | 10/1992 | DeMonte et al. | |
| 5,368,210 A | 11/1994 | Wotring | |
| 5,573,295 A | 11/1996 | Haddad, Jr. | |
| 5,628,442 A * | 5/1997 | Wayne | 224/543 |
| 5,715,978 A * | 2/1998 | Ackeret | 224/42.33 |
| 5,941,666 A * | 8/1999 | Waters | 410/100 |
| 5,988,732 A | 11/1999 | Schouten | |
| 6,007,283 A * | 12/1999 | Labeur | 410/97 |
| 6,109,846 A * | 8/2000 | Davis et al. | 410/100 |
| 6,142,553 A | 11/2000 | Bodecker | |
| 6,183,036 B1 | 2/2001 | Coulson | |
| 6,183,177 B1 * | 2/2001 | Dahlgren | 410/100 |
| 6,406,232 B1 * | 6/2002 | Snitker et al. | 410/142 |
| 6,439,633 B1 * | 8/2002 | Nemoto | 296/37.14 |
| 6,461,090 B1 * | 10/2002 | Faber et al. | 410/100 |
| 6,485,083 B1 | 11/2002 | Giannias | |
| 6,616,389 B1 * | 9/2003 | Ament et al. | 410/118 |
| 6,637,991 B1 * | 10/2003 | Looker et al. | 410/97 |
| 6,666,466 B1 * | 12/2003 | Rainho | 280/47.27 |
| 6,715,973 B1 * | 4/2004 | Faber et al. | 410/100 |
| 6,749,241 B1 * | 6/2004 | Erlandsson et al. | 296/24.4 |
| 6,758,644 B1 * | 7/2004 | Vick | 410/100 |
| 2004/0108344 A1 * | 6/2004 | Green | 224/436 |

FOREIGN PATENT DOCUMENTS

EP 598629 * 5/1994

* cited by examiner

*Primary Examiner*—H. Gutman
(74) *Attorney, Agent, or Firm*—Jackson Walker, LLP (57) ABSTRACT

An apparatus for dispensing a sheet like member is provided. The apparatus is typically used to surround the sidewalls of a multiplicity of articles stacked upon the bed of a flatbed trailer to assist in preventing pieces from falling off the articles onto the highway. The sheet member dispensing apparatus may include a frame with a pair of arms in pivotal engagement therewith. The pair of arms would typically include a pair of rollers, the rollers having a sheet like material entrained thereupon. The pair of arms may be pivoted to the use position and the flexible material dispensed from the roller. When a sufficient amount of material is dispensed from the roller, it is cut and then the ends are tied off to substantially enclose the sidewalls of the stacked articles.

21 Claims, 12 Drawing Sheets

SHEET MEMBER DISPENSING APPARATUS FOR USE WITH ARTICLES STACKED ON A BED OF A TRAILER

BACKGROUND OF THE INVENTION

1. Field of the Invention

Retainment devices for articles stacked on a flatbed trailer, namely a dispenser for engaging a trailer, the dispenser for dispensing a sheet like material for surrounding articles stacked on the bed of a flatbed trailer.

2. Background Information

Flatbed trailers are typically used to transport items loaded on the bed thereof. Sometimes those items contain loose objects that can fall off while the trailer is in transport and generate potential harm to a vehicle traveling behind the trailer. For example, automobile at junkyards are often crushed so they lay flat and then the crushed automobiles are stacked three, four, five or six high on a flatbed trailer. While these crushed vehicles may be retained to the surface of the flatbed trailer as by ropes, chains or the like, loose articles can still fall off the trailer while in transport and be a potential hazard to vehicles following behind the trailer.

Thus, the prior art has provided various devices, methods and schemes to help prevent articles stacked on a flatbed trailer from falling off that trailer on to a roadbed surface.

While the prior art generally discloses tarps or the like which may be wrapped around, stretched over, or otherwise attached to the articles, or to the flatbed of the trailer, none of the prior art discloses a simple, easy to manufacture and easy to use means of roller dispensing a sheet like fabric from a frame assembly as is set forth herein.

3. Objects of the Invention

More specifically, it's the object of the present invention to provide for a flatbed trailer mountable roller dispensing apparatus for dispensing a sheet like material disposed upon a roller or rollers, which rollers are replaceable on the roller dispenser apparatus.

More specifically, it is the object of the present invention to provide for a dispensing apparatus that will receive rollers, the rollers having a sheet like material rolled thereon, which dispensing apparatus in conjunction with the rollers will allow the user to easily roll out a sufficient amount of sheet like material to surround the sidewalls of stacked articles on a flatbed trailer.

More specifically, it is the object of the present invention to provide a roller dispenser apparatus with the frame, the frame having arms and the arms for accepting the rollers, which arms can be pivoted from a dispensing to a non-dispensing position, wherein in the dispensing position the sheet like material may be rolled off of the rollers for wrapping around the sidewalls of the stacked articles, and in which a non-dispensing position would store the rollers out of harms way.

SUMMARY OF THE INVENTION

Applicants provide a device for at least partially enclosing articles stacked on the flatbed of a flatbed trailer. This device typically includes a frame for engagement with the flatbed of the flatbed trailer. The frame may be made from linear steel members. The dispensing apparatus may include a pair of arms in pivoting engagement with the frame, the arms dimensioned for removably, slideably receiving one or a pair of rollers, the rollers bearing sheet like members. An arm operating mechanism may be provided to move the pair of arms between a stored position (out of the way) and a dispensing position in which the user may easily roll off a sufficient amount of sheet material to enclose the sidewalls of the stacked article on the flatbed trailer.

DETAILED DESCRIPTION OF THE PREFERRED EMBODIMENT

Figure 1:
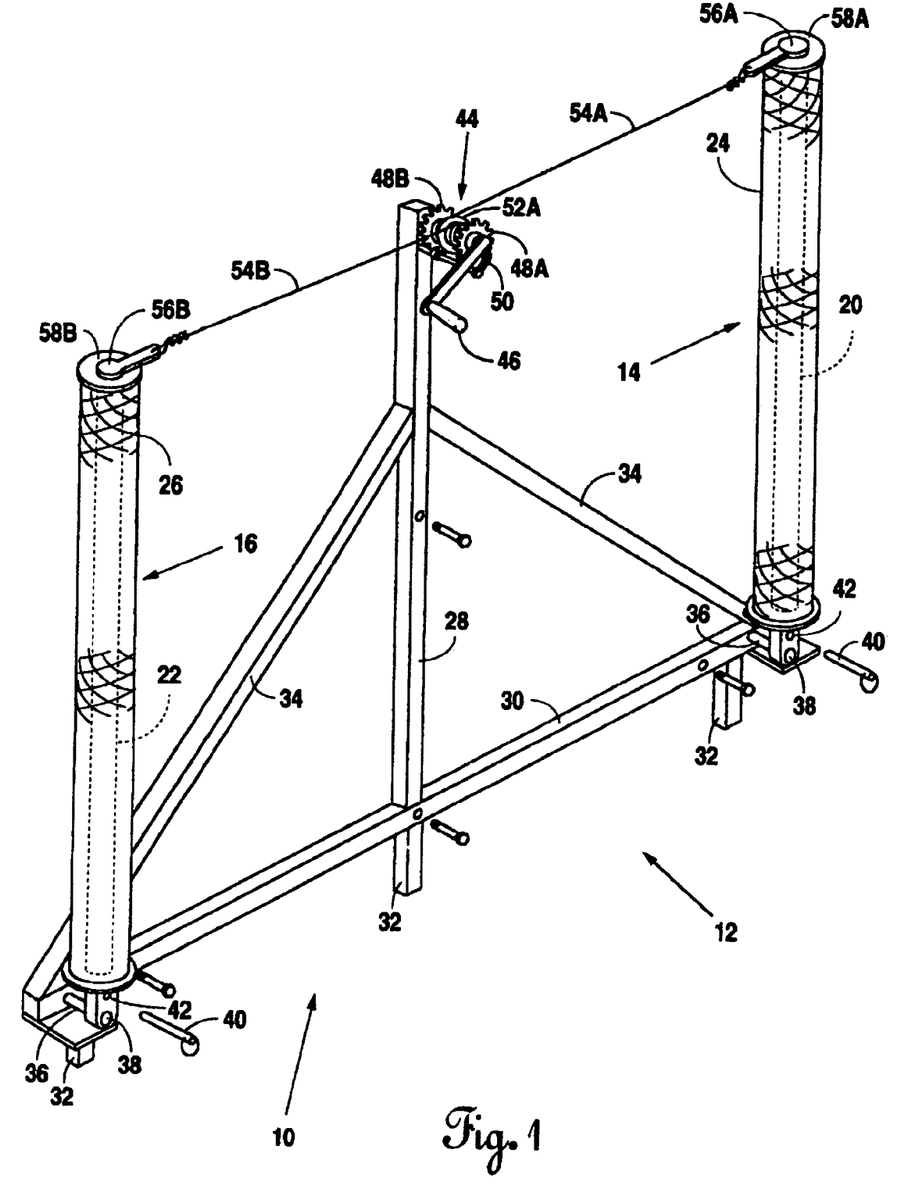
FIG. 1 is a front perspective view of Applicant's sheet member dispensing apparatus.
Figure 1A:
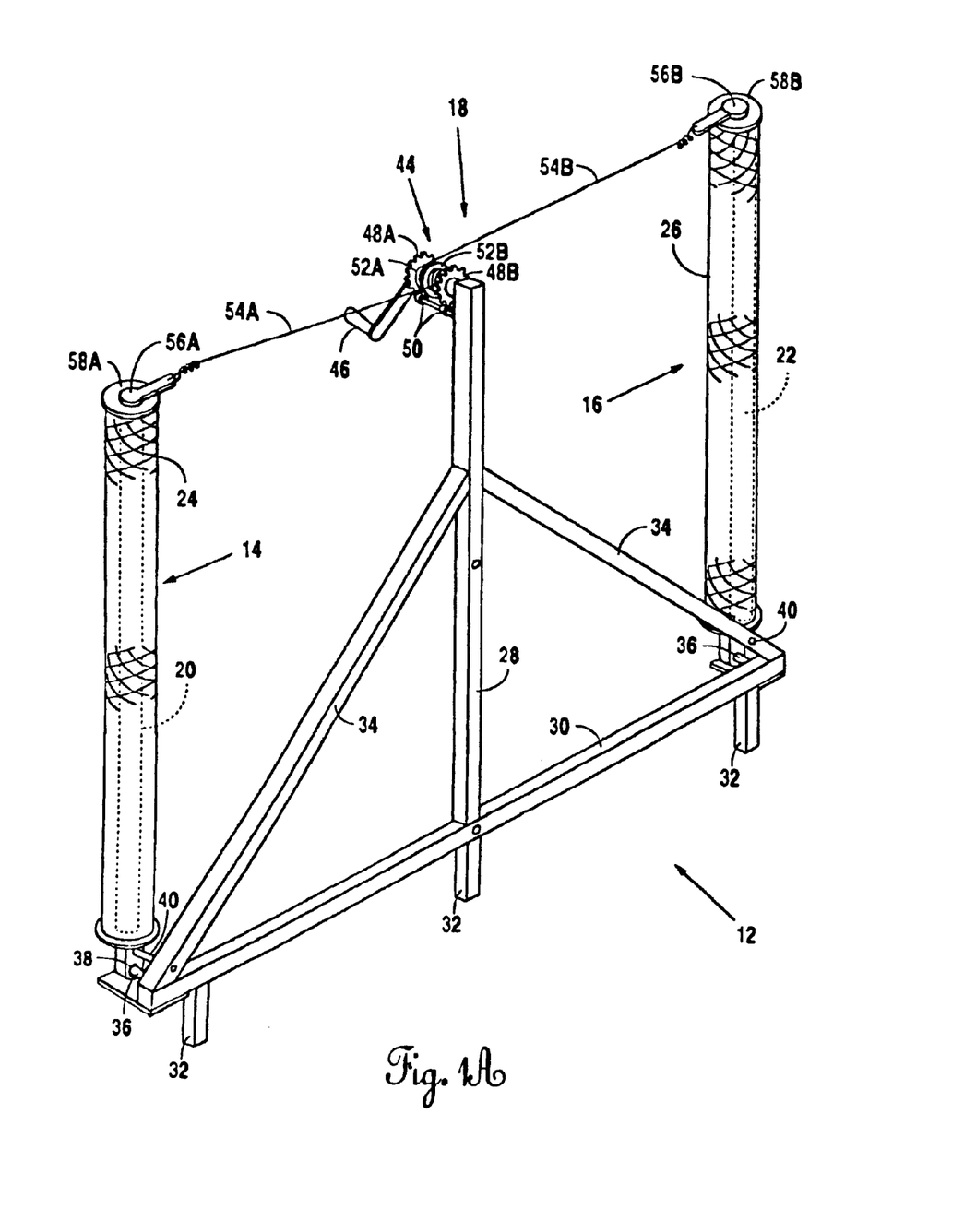
FIG. 1A is a rear perspective view of Applicant's sheet member dispensing apparatus.
Figure 2:
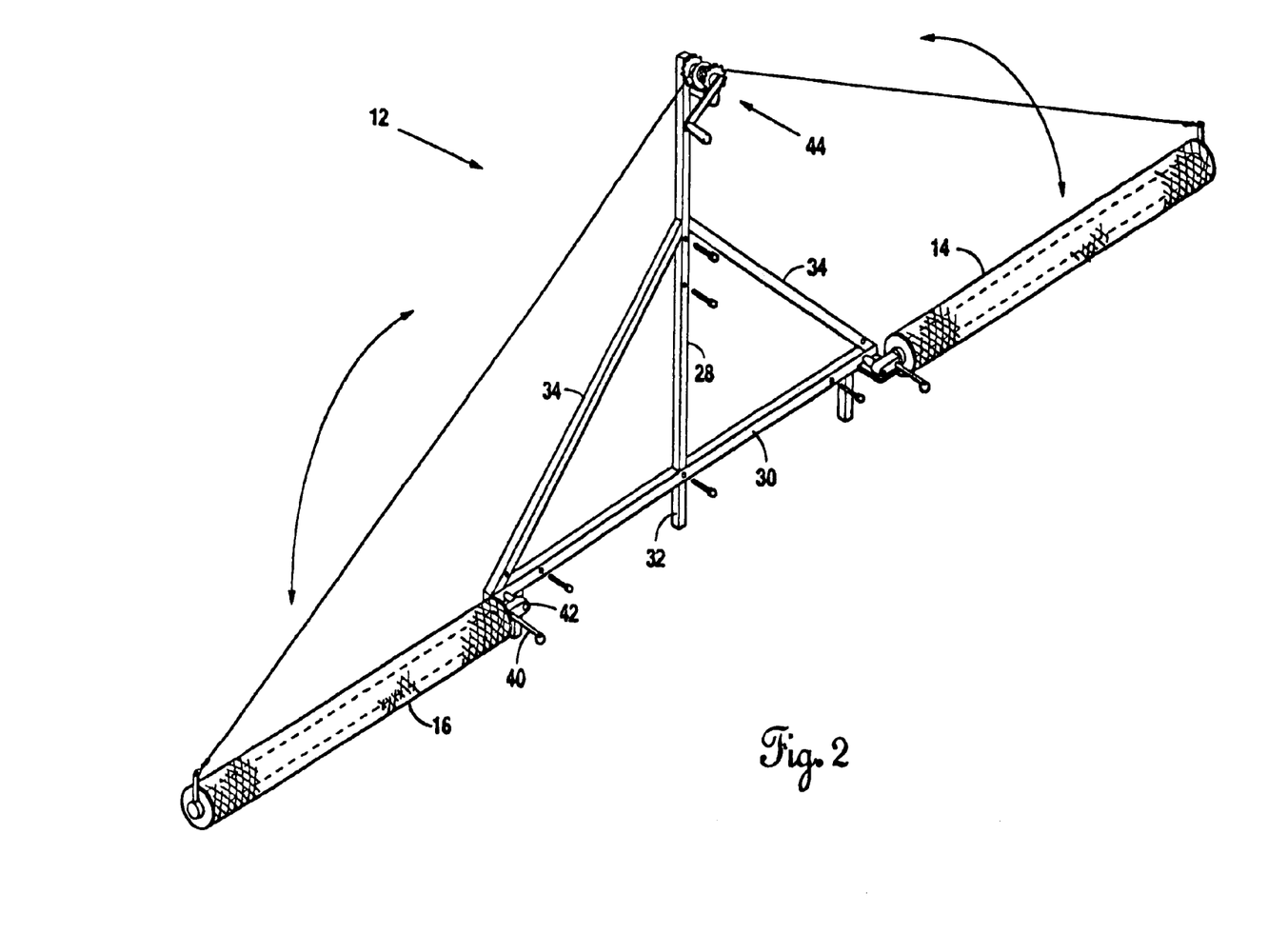
FIG. 2 is a front elevational view of Applicant's sheet member dispensing apparatus, with the pivot arms in a use position, FIGS. 1 and 1A illustrating the pivot arms in a stowed or non-use position.
Figure 2A:
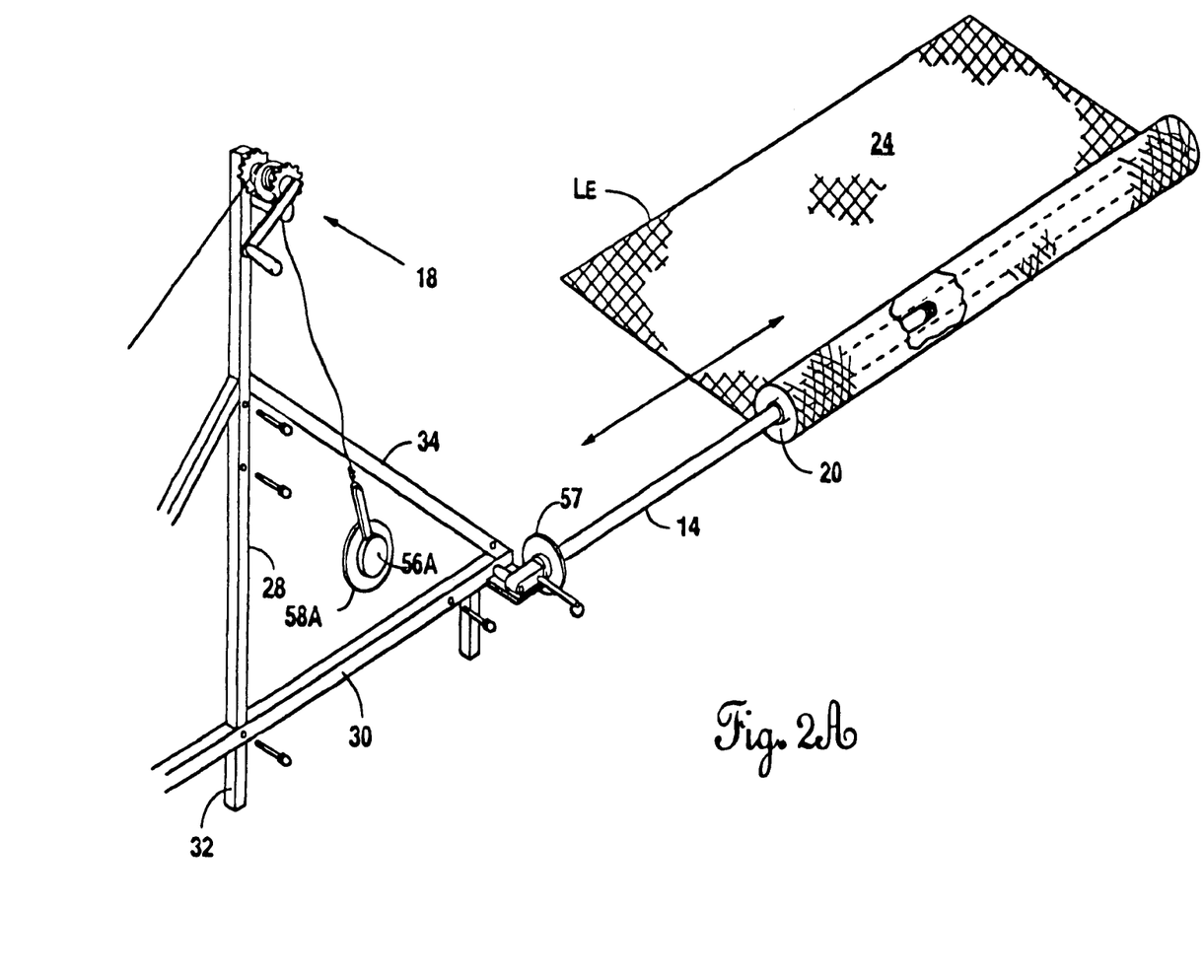
FIG. 2A is a front elevational partial view of one of the arms of Applicant's sheet member dispensing apparatus in an extended or use position with the roller being removed from the pivot arm thereof.

FIG. 1 illustrates applicants novel sheet membered dispensing apparatus (10). It may be seen with reference to all of the figures set forth herein that the sheet member dispensing apparatus (10) includes a frame (12) with a pair of pivot arms, here pivot arm (14) and pivot arm (16) typically mounted to opposite ends of the frame. An arm operating mechanism (18) is provided for moving pivot arms (14) (16) between a non-dispensing or stored position as illustrated in FIG. 1 and a use position or fully extended position, approximately 90° from the stored position illustrated in FIG. 1, such used position illustrated, for example, with respect to pivoting arm (14) illustrated in FIG. 4 with pivoting arm (16) shown in FIG. 4 to illustrate the manner in which the arm is in a intermediate position between a stored position as set forth in FIG. 1 and a fully extended perpendicular or use position as set forth in FIG. 4. Each of the pivot arms (14)(16) are dimension to receive cylindrical rollers (20) (22) thereon, cylindrical rollers being hollow for removable receipt on and off of the pivoting arm as seen in FIG. 2A. It is seen that rollers may be PVC tubes or the like and have a flexible sheet member (24) (26) thereupon, the flexible sheet member rolled up on the rollers and the rollers rotatably mounted to the pivot arms allowing one to grasp the leading edge (LE) of the flexible sheet member, see FIG. 2A. When the roller arms are in the dispensing position and to roll off a sufficient amount of flexible sheet member (24) (26) so as to surround the side walls of stacked articles such as seen in FIGS. 4, 5, 6, 7, and 8. Moreover, with reference to FIG. 2B, it is seen that the trailing edge (TE) of the flexible sheet member (24) (26) may include reinforced holes (25) designed to releaseably engage a series of hooks or pegs (27) mounted on rollers (20) (22). Turning to the details of Frame (12) it is seen that Frame (12) may include a vertically located frame upright (28) and at least one horizontal member (30). Legs (32) may be provided to depend from the horizontal member and for receipt into slots in the frame of the flatbed trailer to releaseably mount the frame to the flatbed trailer. In the alternative, fasteners (13) may be provided to assist in mounting the frame to the flatbed trailer or mounting the frame to a member or panel such as Panel P (see FIG. 7) on a flatbed trailer. Again with reference to FIG. 7, it may be seen that the trailer frame includes leg retainer plates (LP) for receipt of legs (32) therein.

The frame may also include diagonal braces (34) for support of the frame upright (28). Note with reference to FIG. 1 and 3, for example, the manner in which mounting pins (36) are provided at the removed ends of horizontal member (30), the mounting pins for receiving a first end of pivot arms (16) (18), the first ends of the two pivot arms having mounting holes (38) dimensioned for receiving the mounting pin thereon. This manner of mounting will allow the arms to pivot between a stowed or non-use position and a use position in the manner set forth herein.

The frame may also include diagonal braces (34) for support of the frame upright (28). Note with reference to FIGS. 1 and 3, for example, the manner in which mounting pins (36) are provided at the removed ends of horizontal member (30), the mounting pins for receiving a first end of pivot arms (16)(18), the first ends of the two pivot arms having mounting holes dimensioned for receiving the mounting pin thereon. This manner of mounting will allow the arms to pivot between a stowed or non-use position and a use position in the manner set forth herein.

Figure 3:
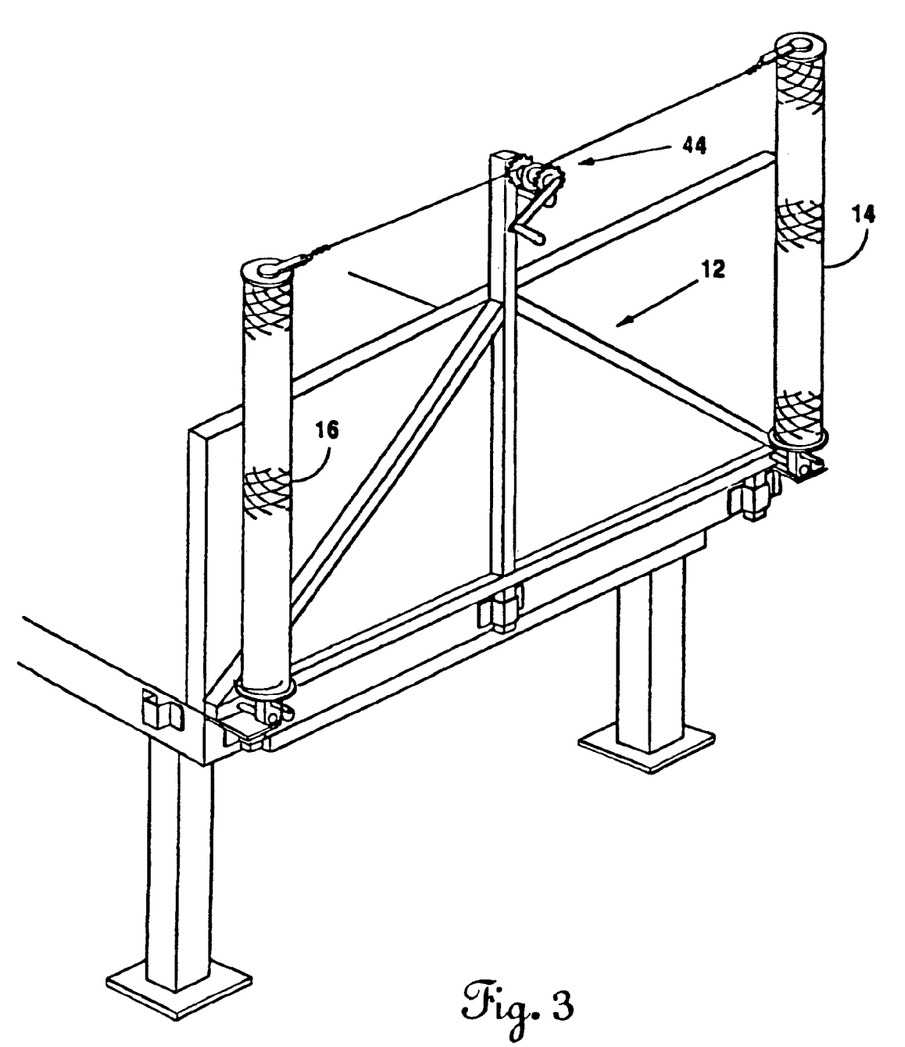
FIG. 3 is a front perspective view illustrating the manner in which Applicant's sheet member dispensing apparatus may utilize a frame which engages the flatbed of a trailer.

FIGS. 1 and 3 both illustrate the sheet member dispensing apparatus with the pivot arms in a stowed or non-use position. Here it is seen that the arms are up and out of the way, being generally within the side members of the frame of the flatbed (see FIG. 3 for example). The pivot arms may be retained in the upright position as seen in FIG. 3 simply by the dogs engaging the gears and the cables, but retainment may also be secured by means of arm locking pins (40) which would slide through locking pin holes (42) in the pivot arms and into holes (43) in the diagonal braces (see FIG. 4) or other parts of the frame.

Figure 8:
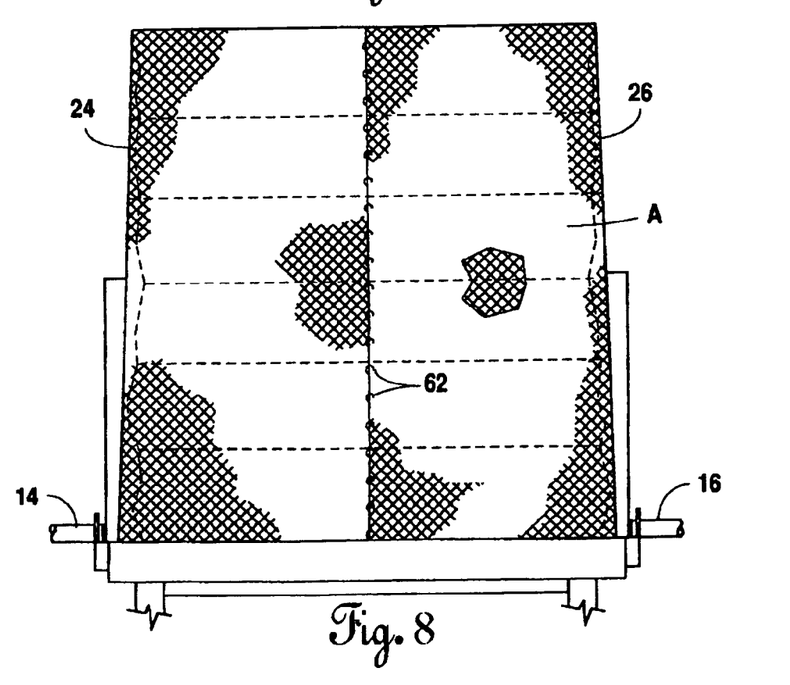
FIG. 8 is a rear elevational view of the flatbed of a flatbed trailer, having a number of articles stacked thereon and Applicant's flexible sheet member engaged the sidewalls thereof, noting the arms in a down or use position.

It is desirable to provide a simple, easy to use mechanism by which the pivot arms can be lowered from the stowed position such as FIG. 1 to the use position such as illustrated in FIG. 8 (FIG. 8 a view of the rear of the truck with sheeting in place). This function is achieved by applicant's arm operating mechanism (18). As seen in the accompanying figures, arm operating mechanism (18) may include a crank or winch assembly (44) here mounted to a removed end of frame upright (28). Crank or winch assembly (44) includes a handle (46) to which is attached a pair of spools (52A&B), the spools wound one clockwise, the other counter-clockwise with two separate cables (54A&B). The handle spool assembly is rotatably mounted to an axle (not shown) extending generally perpendicular from the removed end of the frame upright. Gears (48A&B) are incorporated into the spools and a dog assembly (50) is mounted to the removed end of the upright with the dogs pivoting adjacent the gears so they can be folded into and out of gear locking engagement with the gears. In the alternative, the dog assembly may include spring loaded dogs to be urged against the gears to allow one way motion of the gears, as for example, when cranking the gears from the used dispensing position to a stored position, requiring the dogs to be locked out to reverse spool rotation.

In any case, cranking of the winch assembly may allow the second ends of the pivoting arms to move between the use and non-use position since the removed ends of cables (54A&B) are attached to the second end of the pivot arms, here through use of arm end caps (56A&B) in conjunction with roller retainer members (58A&B). That is, the removed ends of the two cables may be seen to include a cap which is dimensioned to fit snugly and removably on the second end of the arms, for example as by threading within internal threads on the cap and external threads on the second ends of the pivoting arms. Note that the roller retainer members (58A&B) are large enough to retain the rollers on the pivoting arms and further that the first ends of the pivot arms may also have roller retainer members (57) attached thereto so as to capture the rollers (20) (22) between the two roller retainer members on either ends of the pivoting arms.

Figure 2B:
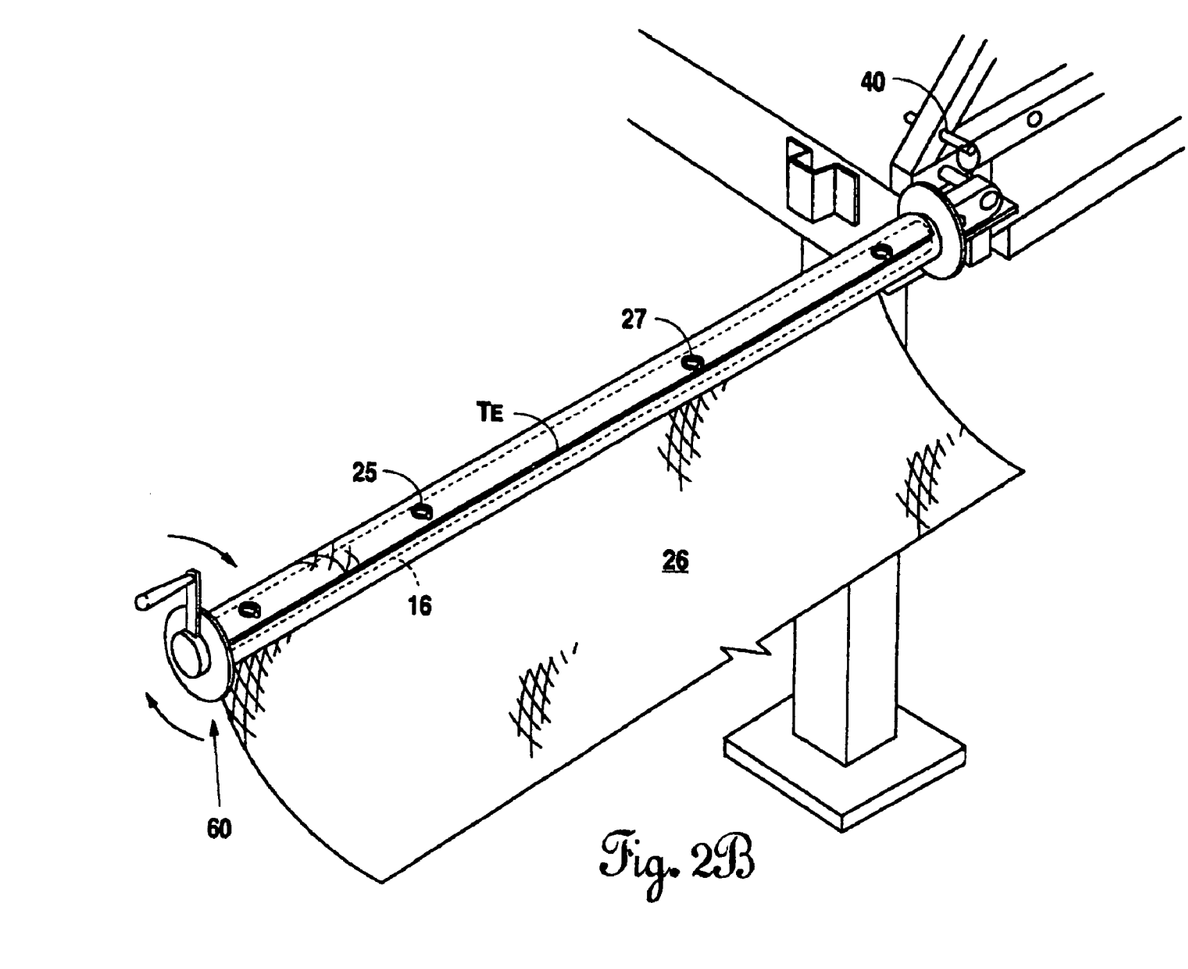
FIG. 2B is a front elevational view of Applicant's sheet member dispensing apparatus with the arm in the use position illustrating the manner in which the flexible sheet member may attach to the roller, as by pegs or hooks engaging holes in the trailing edge of the flexible sheet member.
Figure 4:
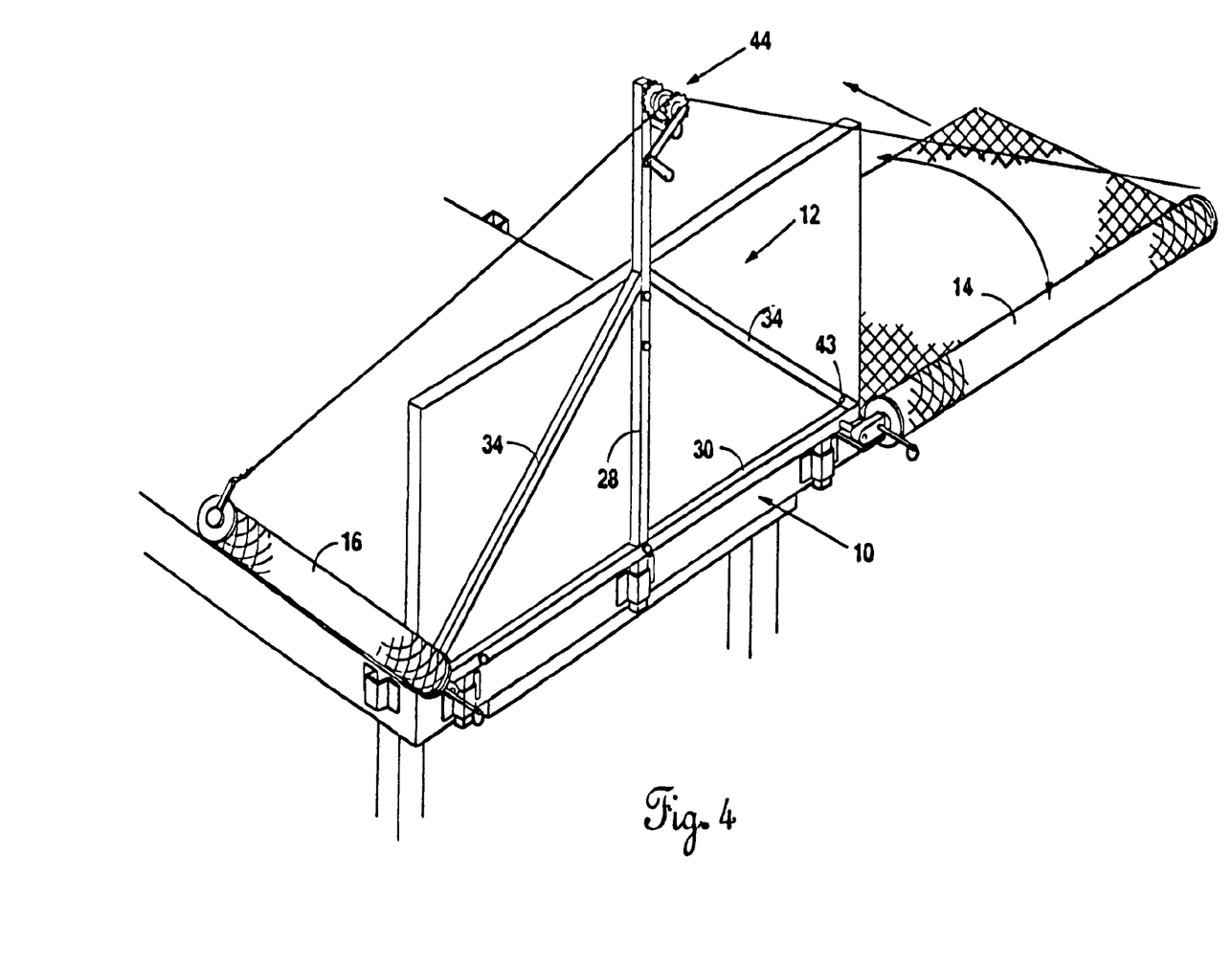
FIG. 4 is a front perspective view of Applicant's sheet member dispensing apparatus with one arm in a down or use position or fully extended position and the other arm in an intermediate position.
Figure 5:
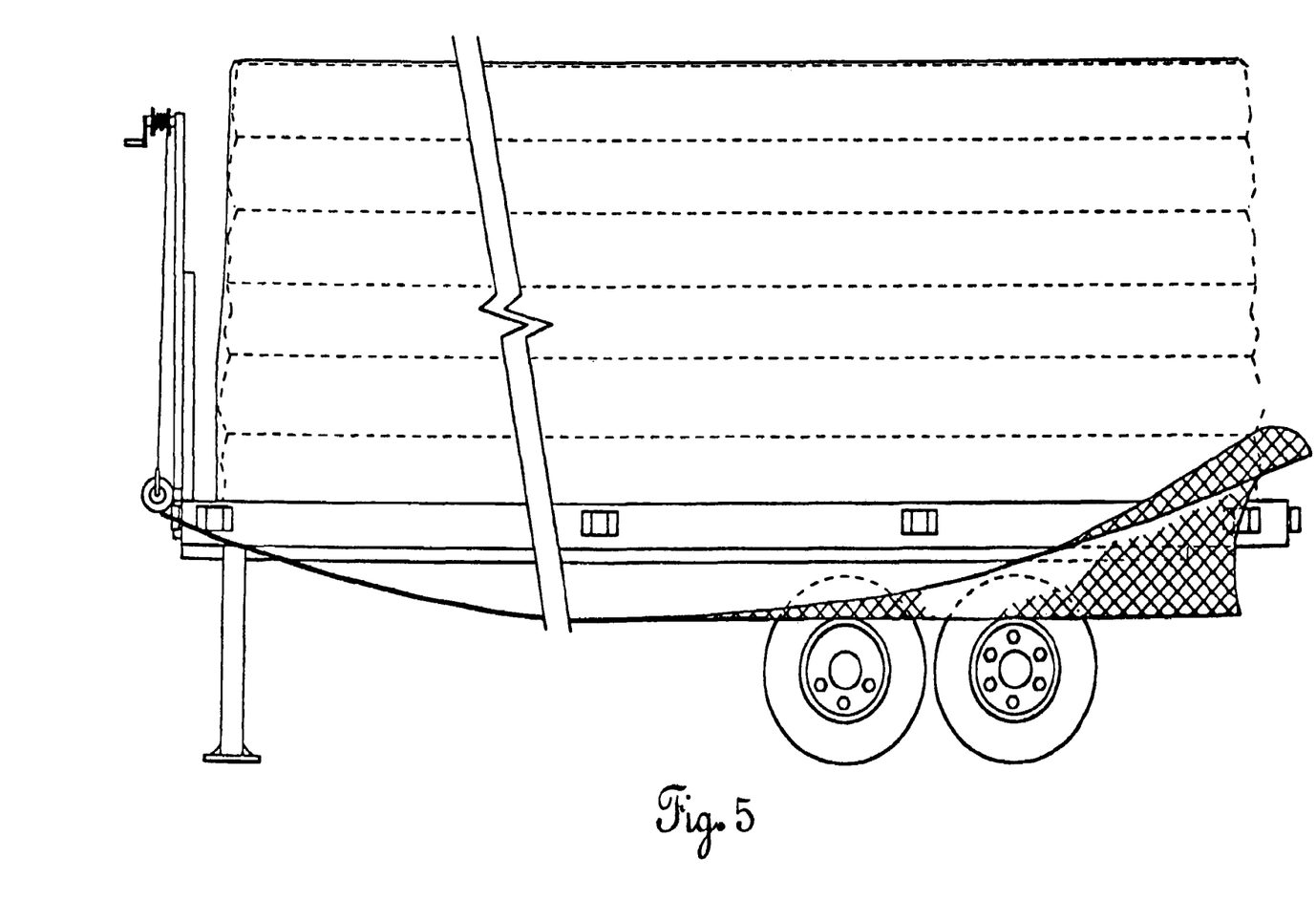
FIG. 5 is a side elevational view of Applicant's sheet member dispensing apparatus used in conjunction with a flatbed trailer having a multiplicity of articles stacked thereon, showing an arm in the down or use position and fabric dispensed from the roller.
Figure 6:
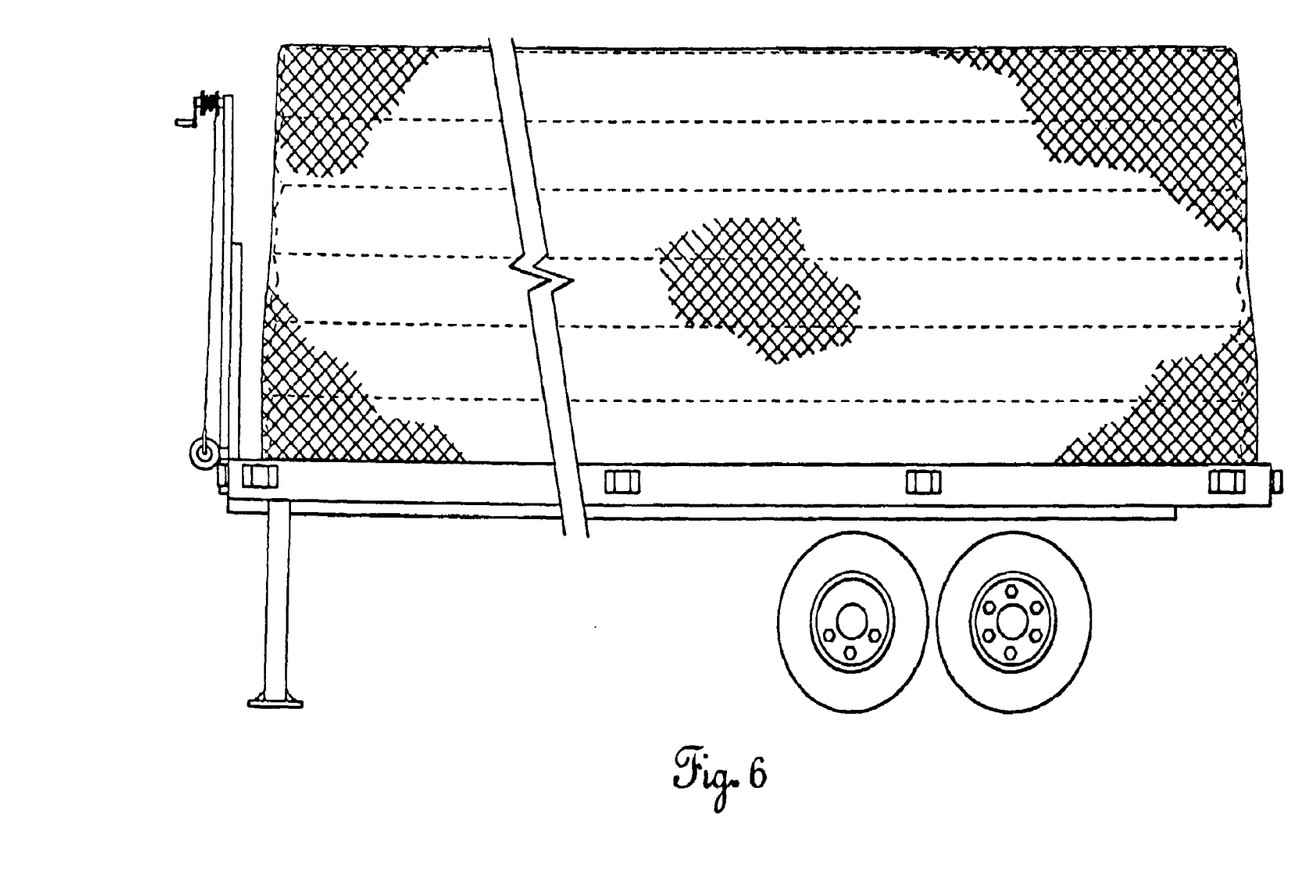
FIG. 6 is a side elevational view of a flatbed of a flatbed trailer with a number of articles stacked thereon and with a flexible sheet like member, having been dispensed from Applicant's sheet member dispensing apparatus, being wrapped around the sidewalls of the stack of articles.
Figure 7:
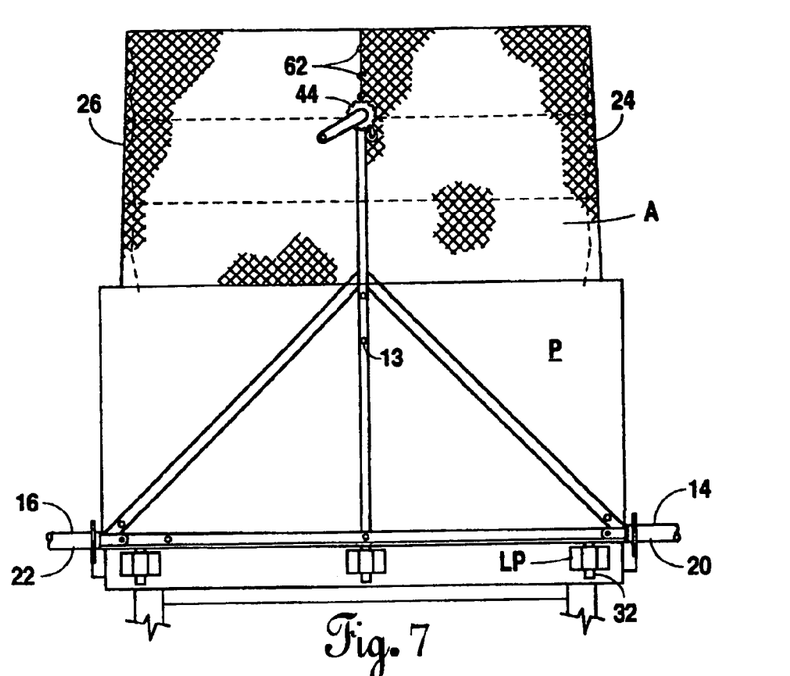
FIG. 7 is a front elevational view of Applicant's sheet member dispensing apparatus with the sheet member dispensed from the arms thereof, which sheet member now encloses the sidewalls of the stack of articles on the flatbed of the flatbed trailer.

In FIGS. 2A, 2B and FIG. 4 it is seen that the rollers are removeable so that the frame assembly may be fixed to the truck flatbed and the user may simply purchase either new rolls of sheet material or sheet material for loading onto rolls such as by crank means (60) as illustrated in FIG. 2B. In other words, applicant has provided that it is a simple and easy dispensing means which may be permanently or semi-permanently attached to the trailer and a means in which the trailer operator, transporting a multiplicity of articles on a flatbed of the trailer, may wrap the articles as by surrounding the sidewalls thereof. Further, this may be done by replacing the sheet material or sheet material mounted on rollers. In the alternative the rollers may be rotatably fixed on the arm, and new sheet material is purchased by the user and installed onto the roller by the user. Indeed, sheet material may be reused by the truck driver by the expedient of simply rewinding the used sheet material back onto the rollers.

Turning now to FIGS. 5, 6, 7 and 8 it is seen that when the arms are set in a use position, the user may unroll a sufficient amount of sheet material to cover these stacked articles (A), or at least the sidewalls thereof by wrapping them around the side (FIGS. 5 and 6) and across the back of the stack where one sheet member (24) will meet the leading edge of the second sheet member (26) and where the two may be fastened together with any simple means, such as with vinyl ties (62). Likewise, after a sufficient amount of sheeting material has been dispensed it can be cut and wrapped around to cover the front end wall of the stacked articles as seen in FIG. 7, again with vinyl ties (62) or the like.

It is to be understood that flexible sheet member (24) (26) is meant in the broadest term to mean any natural material or synthetic material including a net like material or any solid sheet (such as 4 to 8 mil plastic sheeting) or even a SARAN WRAP® type stretchable film material.

Figure 9:
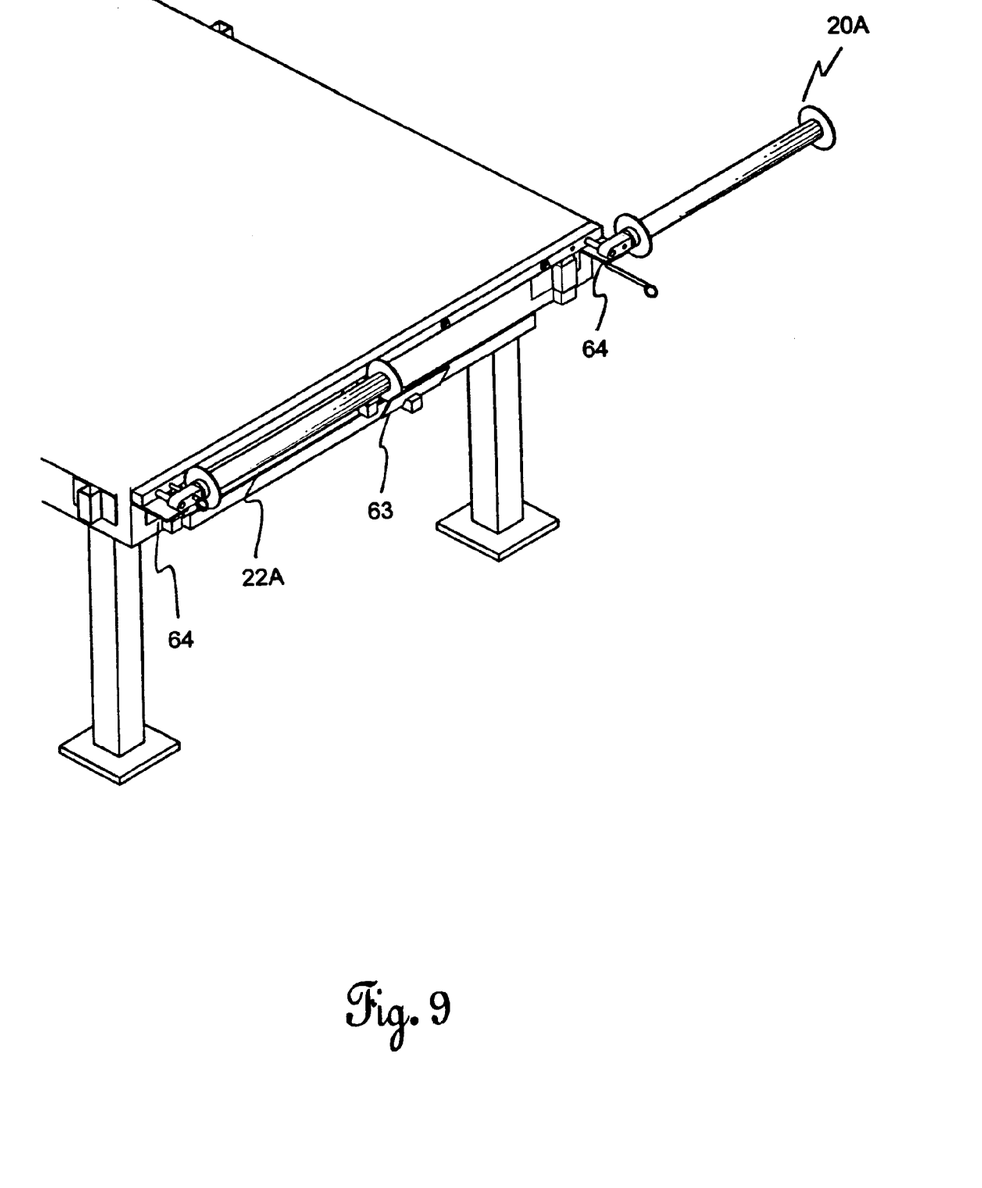
FIG. 9 is a front perspective view of an alternate preferred embodiment of Applicant's sheet member dispensing apparatus wherein one or more pivot arms are directly connected to the flatbed trailer and not mounted to a frame.

FIG. 9 is a front perspective view of an alternate preferred embodiment of Applicant's present invention. Here, pivot arms (20A) and (22A) mount directly to the flatbed trailer itself, typically, for example at a transverse lower member of the flatbed trailer. That is, in this embodiment, the pivot arms do not attach to the frame which in turn attaches to the trailer, but instead attaches directly to the trailer. Moreover, it may be seen that there may be an approximately 180° movement between the use and the non-use position of the arms and furthermore, the ends of the pivot arms, with the rollers thereon, may lay against a retainer plate (63) to help maintain the arms, typically with the rollers thereon, in the stowed position. With reference to FIG. 9 it is seen that support plates (64) may be mounted so that they lay just beneath the near end of the pivot arms, where the pivot arms are attached to a pin which in turn is attached to flatbed of the trailer. Support plates (64) interfere with the near end of the pivot arms, such that when the pivot arms reach the use or dispensing position, they will be maintained in that position by laying flat against the retaining plates (64). Thus, with reference to FIG. 9, Applicant provides a simpler dispensing apparatus, which may pivotally attach one or more arms to the flatbed of a trailer and provide a means, such as one or more support plates for maintaining the at least one roller in the stowed position or the use position, as seen in FIG. 9. Moreover, it is noted here that Applicant states "at least one roller," meaning that a single roller could provide for means of wrapping articles in a flexible sheet member, in which case the user would simply pull the material off the roller to a sufficient length to go all the way around the back of the stacked articles and up the opposite side of the flatbed trailer. In this case, the material dispensed is a single sheet member with the leading edge and trailing edge tied off to one another, typically at the front of the stacked articles (for example, see FIG. 7). That is, with a single roller embodiment, there will be no tie off at the back of the trailer as seen in FIG. 8, the sheet member would simply extend all the way around back to the front of the trailer.

Figure 10:
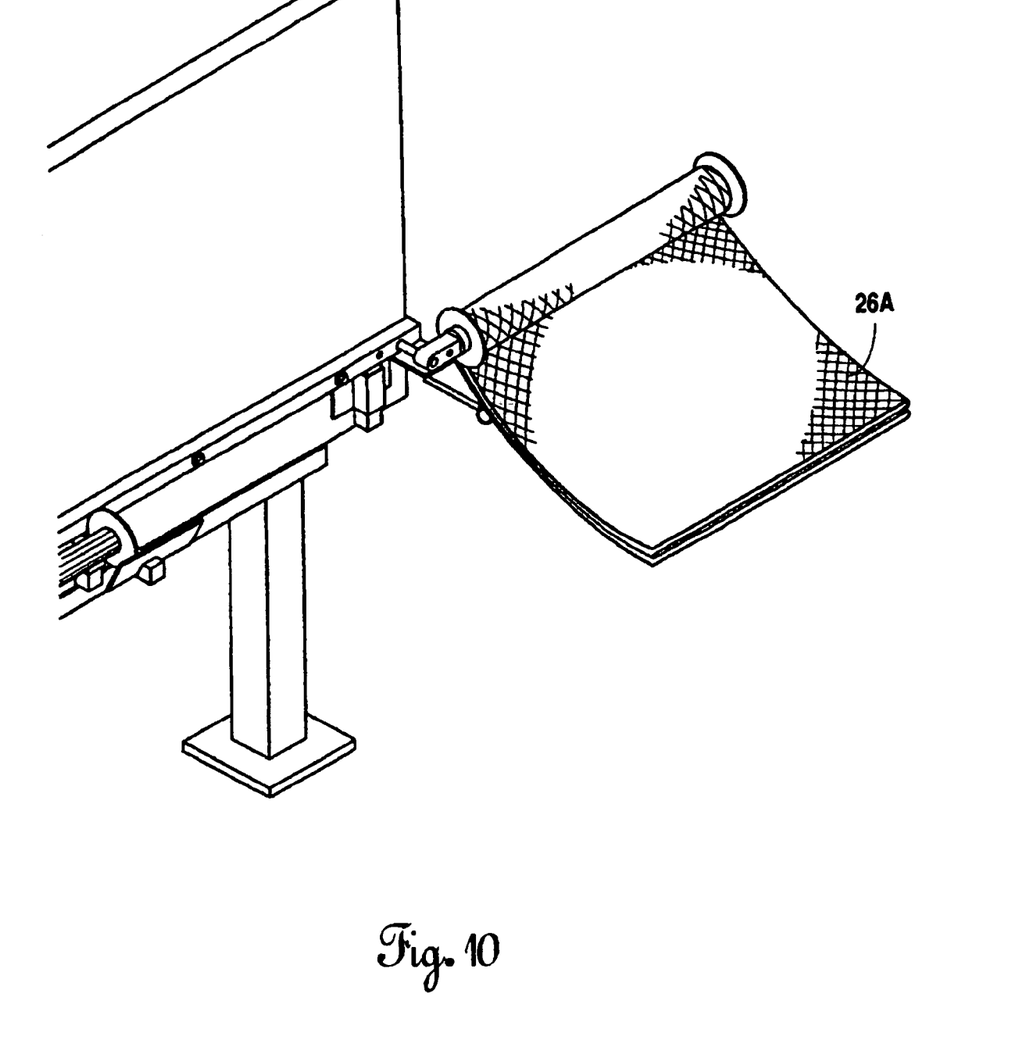
FIG. 10 illustrates a front perspective view of an alternate preferred embodiment of Applicant's cylindrical roller wherein the sheet like member that is dispensed on the roller is folded over a multiple of times.

Turning now to FIG. 10, Applicant provides another novel variation, an alternate preferred embodiment of the sheet dispensing apparatus. More specifically, it is noted with reference to FIG. 10 that the sheet like material is pre-folded before being entrained upon the cylindrical roller. With this embodiment, a user will roll off the sufficient length of material to suit the coverage required and cut the folded flexible sheet member (26A). Upon cutting the folded flexible sheet member (26A), here shown folded in quarters, the user would then unfold the sheet member. Such use of a folder flexible sheet member (26A), such as illustrated in FIG. 10, will allow the use of a roller, typically about 3' to 4' long to dispense a sheet material that can cover a height of 12' to 16', such height representing the approximate height of the stacked articles. In other words, by using Applicant's novel folded flexible sheet material, the user may, upon cutting the pre-selected length of disposed material, unfold it and obtain a sheet that is 12' to 16' high and thus be able to wrap a stack of articles having such a height. It can be appreciated that the use of Applicant's novel folded flexible sheet member (26A) will allow one to use much shorter arms and rollers. Indeed, with the use of such shorter arms and rollers, one may dispense with the requirement of or the desirability of arm operating apparatus (18). While a four folded embodiment is illustrated, any suitable number of folds may be used.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A device for use in at least partially enclosing articles stacked on the bed of a flatbed trailer, the device comprising:
   a frame for engagement with the flatbed trailer;
   a pair of arms for pivoting engagement with the frame, the pair of arms moveable from a non-dispensing position to a dispensing position;
   a pair of flexible sheet members; and
   a pair of rollers for rotatable engagement with the pair of arms, each of the pair of rollers adapted to receive the flexible sheet members in a folded condition, the rollers for rotational attachment to the arms, the rollers capable of dispensing the flexible sheet members when the arms are in the dispensing position.

2. The device of claim 1 further including an arm operating mechanism for movement of the pair of arms between the dispensing and the non-dispensing position.

3. The device of claim 1 wherein the frame includes legs for engagement with the flatbed trailer.

4. The device of claim 1 wherein the pair of arms include locking pins to removably lock the arms into the dispensing position.

5. The device of claim 1 wherein the pair of arms include locking pins to removably lock the arms into the non-dispensing position.

6. The device of claim 1 wherein the pair of flexible sheet members are comprised of netting.

7. The device of claim 1 wherein the sheet members removably attach at a trailing edge thereof to the rollers.

8. The device of claim 1 further including a crank assembly for engagement with the pair of arms to assist in movement of the arms between the non-dispensing and the dispensing position.

9. The device of claim 1 wherein the pair of arms are cylindrical and the rollers are cylindrical.

10. A device for use in at least partially enclosing articles stacked on the bed of a flatbed trailer, the device comprising:
   a first arm in operative engagement with the flatbed trailer, the first arm moveable between a use and a non-use position;
   a first roller for rotatable engagement with the arm wherein the roller is adapted to removably engage the first arm; and
   a first flexible sheet-like member for engagement with the roller.

11. The device of claim 10 wherein the first arm is capable of laying substantially flush with a side of the bed of the flatbed trailer when in the non-use position.

12. The device of claim 10 wherein the roller includes pegs and the flexible sheet-like member includes holes for removably engaging the pegs.

13. The device of claim 10 wherein the flexible sheet-like member is adapted to be folded prior to receipt onto the roller.

14. The device of claim 10 wherein the flexible sheet-like member is comprised of net.

15. The device of claim 10 further including a second arm, a second roller and a second flexible sheet-like member.

16. The device of claim 15 further including a plate member to assist in maintaining the arms in the non-use position.

17. The device of claim 15 further including locking pins for locking the arms in either of the use or non-use position.

18. The device of claim 15 wherein the flexible sheet-like members are comprised of a net.

19. A device for use in at least partially enclosing articles stacked on the bed of a flatbed trailer, the device comprising:
   a frame for engagement with the flatbed trailer;
   a pair of arms for pivoting engagement with the frame, the pair of arms moveable from a non-dispensing position to a dispensing position;
   a pair of flexible sheet members; and
   a pair of rollers for removable and rotatable engagement with the pair of arms, each of the pair of rollers adapted to receive the flexible sheet members, the rollers for rotational attachment to the arms, the rollers capable of dispensing the flexible sheet material when the arms are in the dispensing position.

20. A device for use in at least partially enclosing articles stacked on the bed of a flatbed trailer, the device comprising:
   a first arm in operative engagement with the flatbed trailer, the first arm moveable between a use and a non-use position;
   a first roller in removable and rotatable engagement with the arm, the first roller having a roller length; and
   a first flexible sheet-like member for engagement with the roller wherein the first flexible sheet-like member has a first width approximately equal to the roller length and a second width, the second width substantially greater than the roller length, the second width for at least partially enclosing the stacked articles on the bed of a flatbed trailer.

21. A device for use in at least partially enclosing articles stacked on the bed of a flatbed trailer, the stacked articles having a perimeter, the device comprising:
   a first arm in operative engagement with the flatbed trailer, the first arm moveable between a use and a non-use position;
   a first roller for rotatable engagement with the arm; and
   a first flexible sheet-like member for engagement with the roller wherein the first flexible sheet-like member has a leading edge and a length substantially greater than the perimeter of the articles stacked on the bed of a flatbed trailer wherein the first sheet-like member is adapted to be severed and engaged, said severed edge adapted to engage said leading edge when the severed portion of said flexible sheet-like member is wrapped around the stacked articles.

* * * * *